US006826604B2

(12) United States Patent
Yamaguchi et al.

(10) Patent No.: US 6,826,604 B2
(45) Date of Patent: *Nov. 30, 2004

(54) INPUT/OUTPUT DEVICE INFORMATION MANAGEMENT SYSTEM FOR MULTI-COMPUTER SYSTEM

(75) Inventors: Toshio Yamaguchi, Yokohama (JP); Kazuo Imai, Higashikurume (JP); Masatoshi Haraguchi, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/337,321

(22) Filed: Jan. 7, 2003

(65) Prior Publication Data

US 2003/0105843 A1 Jun. 5, 2003

Related U.S. Application Data

(63) Continuation of application No. 09/963,473, filed on Sep. 27, 2001, now Pat. No. 6,526,441, which is a continuation of application No. 09/638,027, filed on Aug. 15, 2000, now Pat. No. 6,341,308, which is a continuation of application No. 08/948,071, filed on Oct. 9, 1997, now Pat. No. 6,115,738, which is a continuation of application No. 08/371,376, filed on Jan. 11, 1995, now Pat. No. 5,717,950.

(30) Foreign Application Priority Data

Jan. 11, 1994 (JP) .............................................. 6-001234

(51) Int. Cl.[7] ...................... G06F 15/177; G06F 15/167
(52) U.S. Cl. ....................................... 709/220; 709/213
(58) Field of Search ................................. 709/220, 221, 709/213, 214, 215, 216, 217, 223; 711/100, 147, 221; 710/46

(56) References Cited

U.S. PATENT DOCUMENTS

| 4,697,232 A | 9/1987 | Brundle et al. ................ 710/46 |
| 4,855,899 A | 8/1989 | Presant ........................ 395/856 |

(List continued on next page.)

FOREIGN PATENT DOCUMENTS

| EP | 266789 | 11/1988 |
| JP | 3175532 | 7/1991 |
| JP | 3269754 | 12/1991 |
| JP | 490024 | 3/1992 |

*Primary Examiner*—Mehmet B. Geckil
(74) *Attorney, Agent, or Firm*—Antonelli, Terry, Stout & Kraus, LLP

(57) ABSTRACT

In a multi-computer system having a plurality of computers, an input/output device configuration definition table and an input/output device configuration reference table are adapted to be collectively managed. A configuration management program manages the configuration definition of all input/output devices of a plurality of computers by using the input/output device configuration definition table, and generates a changed data file when an input/output device configuration is changed. Dynamic system alteration is effected by changing the contents of the input/output device configuration reference table stored in a shared memory, in accordance with the changed data file. The input/output device configuration definition table and the input/output device configuration reference table each have an input/output device information part and an input/output device connection information part arranged in a matrix form to allow addition/deletion of an input/output device and a computer.

18 Claims, 13 Drawing Sheets

U.S. PATENT DOCUMENTS

| | | | |
|---|---|---|---|
| 5,125,081 A | 6/1992 | Chiba | 395/284 |
| 5,170,472 A | 12/1992 | Cwiakala et al. | 395/821 |
| 5,175,800 A | 12/1992 | Galis et al. | 395/51 |
| 5,187,795 A | 2/1993 | Balmforth et al. | 395/800 |
| 5,201,040 A | 4/1993 | Wada et al. | 395/400 |
| 5,220,654 A | 6/1993 | Benson et al. | 395/275 |
| 5,253,344 A | 10/1993 | Bostick et al. | 395/821 |
| 5,257,379 A | 10/1993 | Cwiakala et al. | 395/700 |
| 5,297,262 A | 3/1994 | Cox et al. | 395/821 |
| 5,377,324 A | 12/1994 | Kabemoto et al. | 711/148 |
| 5,414,851 A | 5/1995 | Brice, Jr. et al. | 395/650 |
| 5,446,841 A | 8/1995 | Kitano et al. | 395/200.43 |
| 5,452,455 A | 9/1995 | Brown et al. | 713/100 |
| 5,459,857 A | 10/1995 | Ludlam et al. | 714/6 |
| 5,459,867 A | 10/1995 | Adams et al. | 709/321 |
| 5,465,352 A | 11/1995 | Nakazawa et al. | 395/600 |
| 5,465,355 A | 11/1995 | Cook et al. | 395/200.15 |
| 5,504,926 A | 4/1996 | Jackson | 395/825 |
| 5,507,032 A | 4/1996 | Kimura | 395/826 |
| 5,522,045 A | 5/1996 | Sandberg | 395/200.08 |
| 5,592,625 A | 1/1997 | Sandberg | 395/200.08 |
| 5,717,950 A | 2/1998 | Yamaguchi et al. | 395/828 |
| 5,841,991 A | 11/1998 | Russell | 395/200.51 |
| 6,115,738 A | 9/2000 | Yamaguchi et al. | 709/213 |
| 6,341,308 B1 * | 1/2002 | Yamaguchi et al. | 709/220 |
| 6,526,441 B2 * | 2/2003 | Yamaguchi et al. | 709/220 |

\* cited by examiner

I/O DEVICE CONNECTION INFORMATION PART GENERATING PROCESS 15b

I/O DEVICE CONFIGURATION DEFINITION TABLE DIAGNOSING PROCESS 15c

CHANGED DATA FILE GENERATING PROCESS 15d

I/O DEVICE CONFIGURATION DEFINITION TABLE COPYING PROCESS 15e

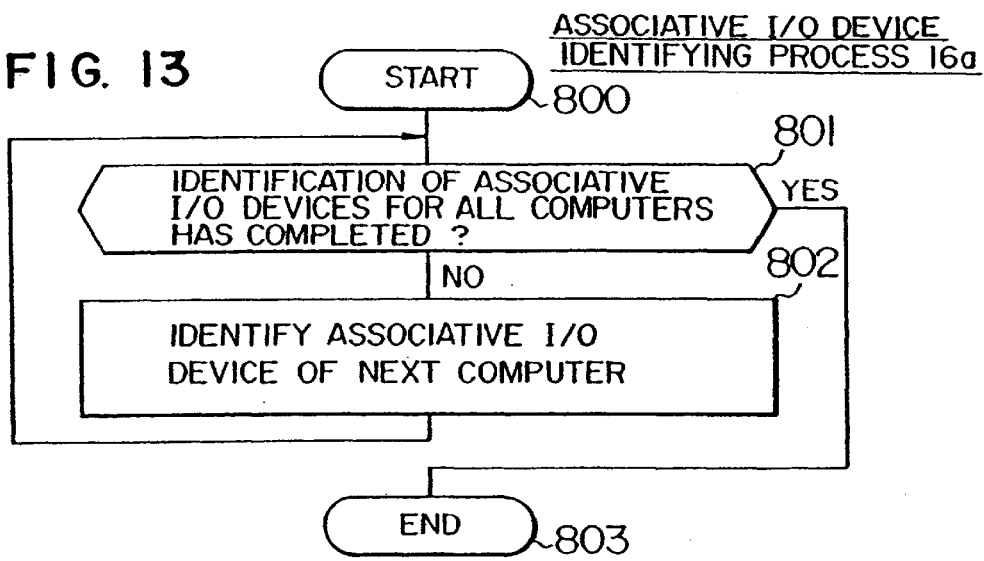
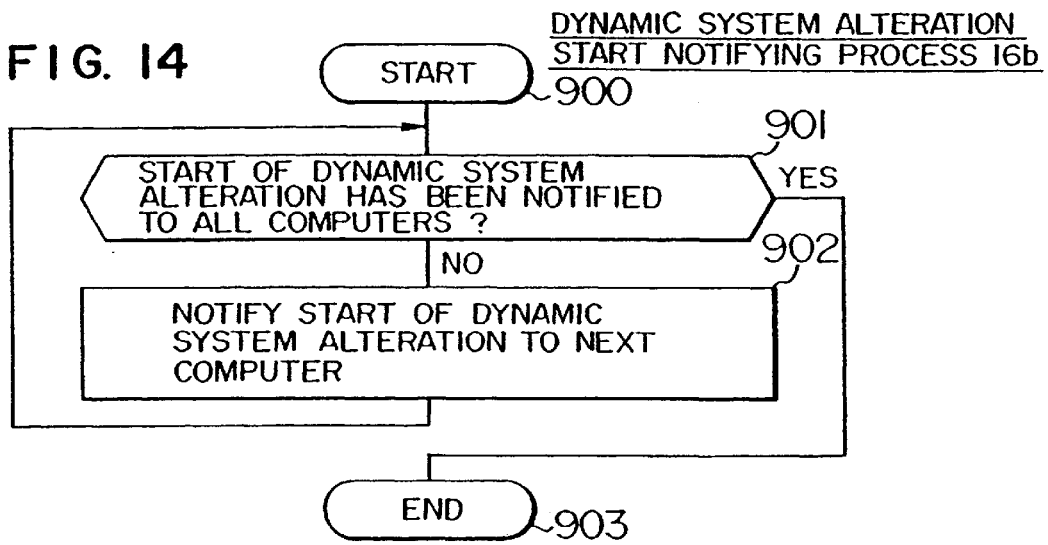
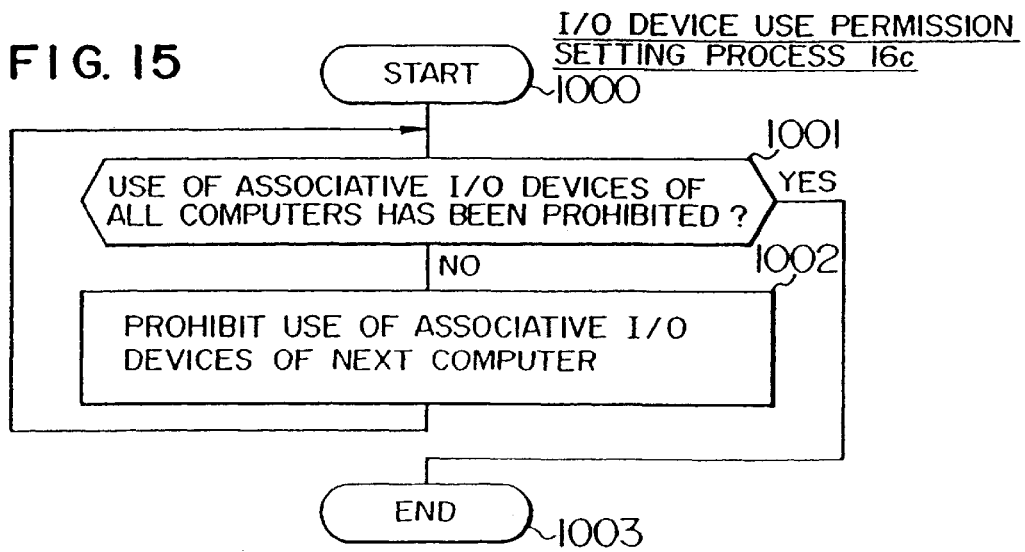

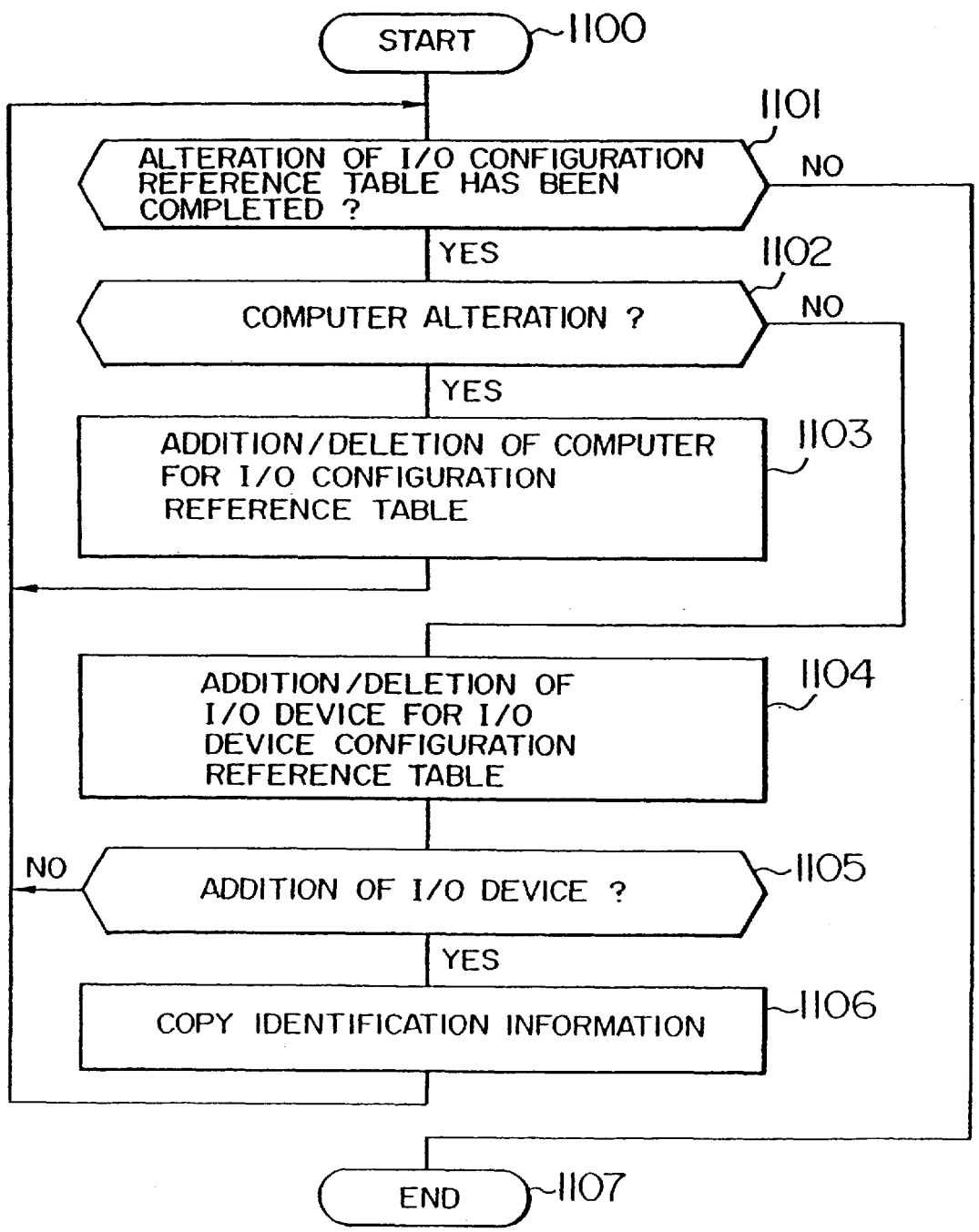

I/O DEVICE CONNECTION INFORMATION PART CHANGING PROCESS 16e

DYNAMIC SYSTEM ALTERATION END NOTIFYING PROCESS 16f

INPUT/OUTPUT DEVICE INFORMATION MANAGEMENT SYSTEM FOR MULTI-COMPUTER SYSTEM

This application is a continuation of Ser. No. 09/963,473, filed Sep. 27, 2001, now U.S. Pat. No. 6,526,441 which in turn is a continuation of Ser. No. 09/638,027 filed on Aug. 15, 2000 (now U.S. Pat. No. 6,341,308), which in turn is a continuation of Ser. No. 08/948,071 filed on Oct. 9, 1997 (now U.S. Pat. No. 6,115,738), which in turn is a continuation of Ser. No. 08/371,376 filed on Jan. 11, 1995 (now U.S. Pat. No. 5,717,950).

BACKGROUND OF THE INVENTION

Field of the Invention

The present invention relates to a collective management system for input/output device information in a multi-computer system containing a plurality of computers. More particularly, the invention relates to a collective management system for input/output (I/O) device information in which an input/output device configuration table and an input/output device configuration reference table can be updated collectively and at the same time, the former table defining the configurations of all input/output devices used in the multi-computer system and the latter table having a format allowing the references by each computer for the execution of data input/output of each input/output unit.

A conventional technique for managing input/output device information is disclosed, for example, in JP-A-4-90024. According to this technique, a specific computer in a multi-computer system performs system generation to generate volumes resident at each computer.

Another conventional technique is disclosed in JP-A-3-269754. According to this technique, identification information of input/output devices for each computer is stored in advance in a shared file in the form of database, and a file of input/output device configuration information, which is a combination of connection information and identification information of input/output devices, is formed for each computer.

A conventional technique for dynamic system alteration is disclosed, for example, in JP-A-3-175532. According to this technique, system generation information, having a format allowing the reference by each computer for the execution of data input/output of each input/output device, is stored in a memory of each computer. After the system generation information is altered by a definition program at one computer, other computers read the altered system generation information.

With the conventional technique for managing input/output devices, an input/output configuration definition table and an input/output configuration reference table are provided for each computer. It is necessary for each computer of a multi-computer system to define the configurations of shared input/output devices, thereby posing a problem of lowering a resource usage efficiency and increasing the process load of each computer caused by the need of defining the configuration.

With the conventional technique for dynamic system alteration, after an input/output device configuration reference table stored in each computer of a multi-computer system is altered, other computers are required to read the altered input/output device configuration reference table, thereby posing a problem of a need of a number processes for the addition, deletion, or change of shared input/output devices.

SUMMARY OF THE INVENTION

It is an object of the present invention to solve the problems associated with conventional techniques by providing an input/output device information management system for a multi-computer system having a plurality of computers, the management system being capable of collectively managing an input/output device configuration definition table and an input/output device configuration reference table, the former table defining configurations of all input/output devices used by the multi-computer system and the latter table having a format allowing the reference by each computer for the execution of data input/output of each input/output device, and being capable of dynamically updating both tables when any alteration such as addition, deletion, and change of an input/output device or a computer is made by a computer during its operation.

The above object of the invention is achieved by an input/output device configuration definition table stored in a shared file of the multi-computer system for defining the configurations of all input/output devices used by a multi-computer system, the input/output device configuration definition table having an input/output device information part and an input/output device connection information part disposed in a matrix form. This table allows the configurations of all input/output devices shared in the multi-computer system to be simply defined.

The above object of the invention is achieved by an input/output configuration reference table stored in a shared memory of the computer network, the input/output configuration reference table being obtained by reading the input/output configuration definition table and transforming the definition table into the format allowing the reference by each computer for the execution of data input/output of each input/output device, and the input/output device configuration reference table having an input/output device information part and an input/output device connection information part disposed in a matrix form. This table allows all input/output devices shared by the multi-computer system to be managed collectively.

In the multi-computer system having a plurality of computers, the input/output device configuration definition table and the input/output device configuration reference table each have an input/output device information part storing identification information of each input/output device such as a type and an attribute, and an input/output device connection information part storing connection information between input/output devices and computers, both the parts being disposed in a matrix form. With input/output device configuration definition table and the input/output device configuration reference table, a correspondence between all input/output devices and computers of the multi-computer system can be managed collectively.

Any computer can collectively update both the input/output device configuration definition and reference tables by a single set of operations, when an input/output device or a computer is added, deleted, or changed.

BRIEF DESCRIPTION OF THE DRAWINGS

FIG. 13 is a flow chart explaining the operation of an associative input/output device identifying process of the system alteration procedure;

FIG. 14 is a flow chart explaining the operation of a dynamic system alteration start notifying process;

FIG. 15 is a flow chart explaining the operation of an input/output device use permission setting process;

FIG. 16 is a flow chart explaining the operation of an input/output device information part changing process;

DESCRIPTION OF THE PREFERRED EMBODIMENT

An embodiment of an input/output device information management system of the invention is described in detail below with references to the accompanying drawings.

Figure 1A:
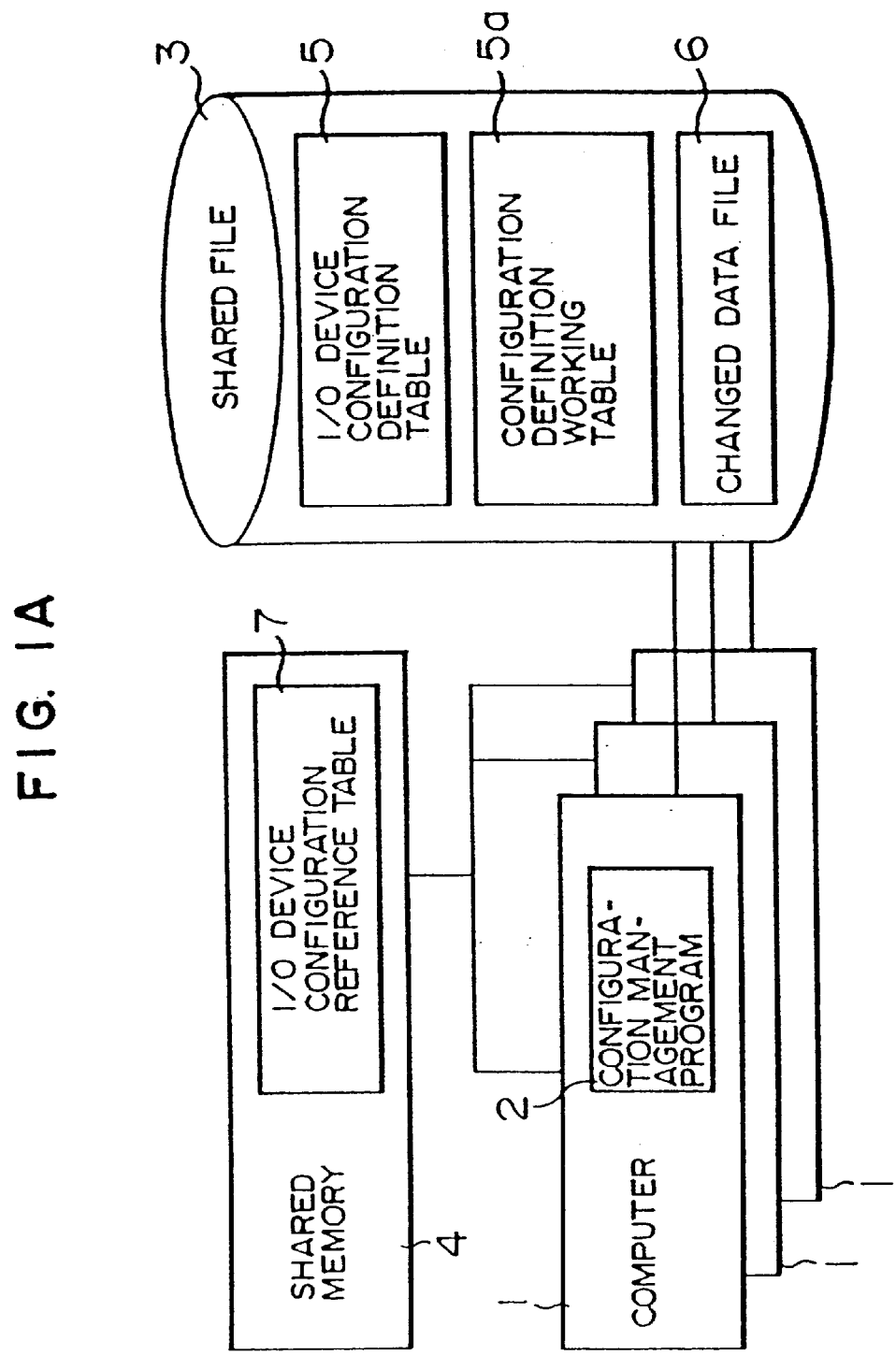
FIG. 1A is a block diagram showing the configuration of a multi-computer system.
Figure 1B:
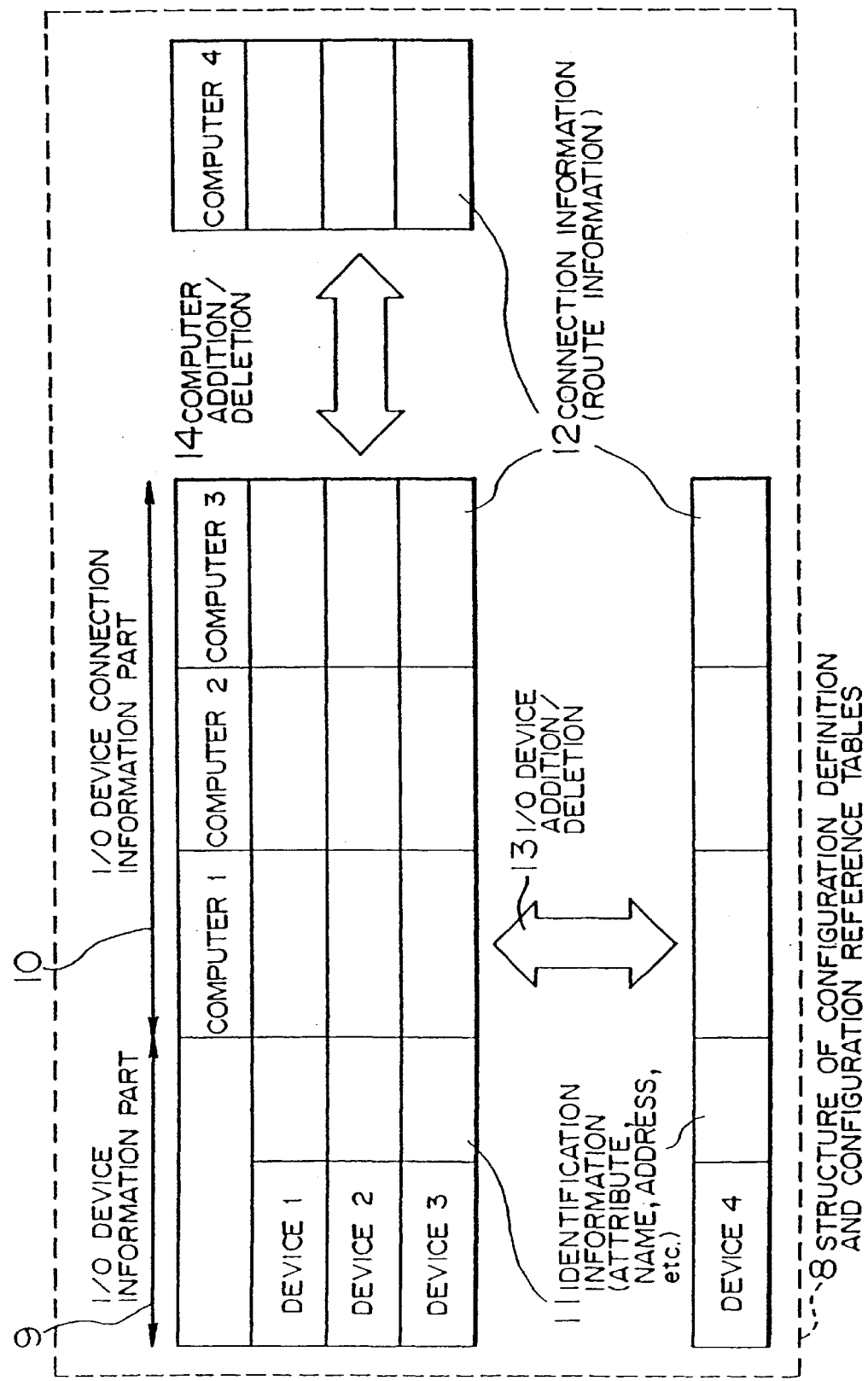
FIG. 1B is a block diagram showing the structures of an input/output device configuration definition table and an input/output device configuration reference table.

Referring to FIGS. 1A and 1B, the input/output device information management system for a multi-computer system includes computers 1, a configuration management program 2, a shared file 3, a shared memory 4, an input/output device configuration definition table 5, a configuration definition working table 5a, a changed data file 6, an input/output device configuration reference table 7, an input/output device identification information part 9, and an input/output device connection information part 10.

As shown in FIG. 1A, the multi-computer system of the invention includes a plurality of computers 1, the configuration management program 2 running on each computer 1 for managing the configurations of all input/output devices, the shared file 3 for the plurality of computers 1, the shared memory 4 for the plurality of computers 1, the input/output configuration definition table 5 stored in the shared file 3 for storing the data defining the configurations of all input/output devices used by the plurality of computers 1, the configuration definition working table 5a used for editing the input/output configuration definition table 5, the changed data file 6 for storing the changed data of the input/output configuration definition table 5a, and the input/output configuration reference table 7 stored in the shared memory 4, the input/output configuration reference table 7 being obtained by reading the input/output configuration definition table 5 and transforming the table 5 into the format allowing the reference by each computer for the execution of data input/output of each input/output device.

As shown in FIG. 1B, the input/output configuration definition table 5 and input/output configuration reference table 7 each have the structure indicated at 8 in FIG. 1B.

Specifically, stored in a matrix form are the input/output device information part 9 for storing the data defining the identification information 11 such as a type and an attribute of each input/output device and the input/output device connection information part 10 for storing the data defining the connection information between each input/output device and each computer. By referring to both the parts 9 and 10, addition/deletion 13 of input/output devices and addition/deletion 14 of computers are performed.

The identification information 11 is the definition information of the input/output device entered upon system generation, such as an attribute, a name, and an address of each input/output device necessary for the execution of data input/output of the input/output device.

The input/output device configuration reference table 7 also stores data necessary for the management of each input/output device by each computer, such as whether what input/output device is in use by what computer and whether what input/output device is inhibited to use.

Figure 2:
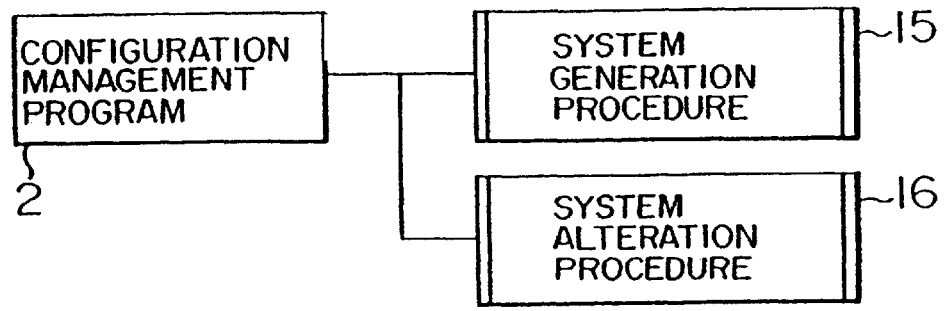
FIG. 2 is a diagram showing an example of the structure of a configuration management program according to an embodiment of the invention.

The configuration management program 2 may run on all computers of the multi-computer system or on one or more computers of the multi-computer system. As shown in FIG. 2, this configuration management program 2 contains a system generation procedure 15 and a system alteration procedure 16. The system generation procedure 15 generates the input/output configuration definition table 5 and the changed data file 6. In accordance with the changed data file 6, the system alteration procedure 16 enters the information on addition, deletion, or change of an input/output device and a computer into the input/output configuration reference table 7 for the dynamic alteration of the multi-computer system. The changed data file 6 also stores a dynamic alteration flag. This flag is referred to by the system alteration procedure 16 of the configuration management program 2 when the dynamic alteration is executed.

Figure 3:
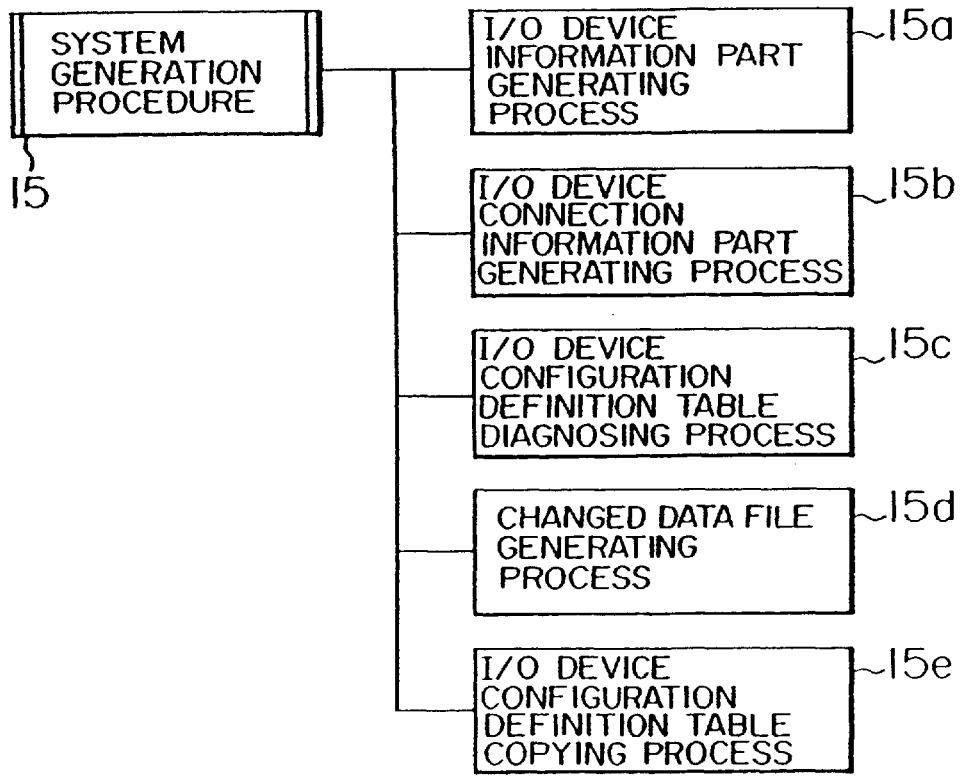
FIG. 3 is a diagram showing an example of the structure of a system generation procedure.

As shown in FIG. 3, the system generation procedure 15 of the configuration management program 2 includes an input/output device information generating process 15a, an input/output device connection information generating process 15b, an input/output device configuration definition table diagnosing process, a changed data file generating process 15d, and an input/output device configuration definition table copying process 15e.

The input/output information generating process 15a generates the input/output device information part 9 and identification information 11 of the configuration definition table 5.

The connection information generating process 15b generates the input/output device connection information part 10 and connection information 12 of the configuration definition table 5.

The configuration definition table diagnosing process 15c diagnoses whether there is any data error or an integrity error between computers in the input/output device information part 9 and input/output device connection information part 10 of the configuration definition table 5.

The changed data file generating process 15*d* generates the changed data file 6 which stores the changed data of the configuration definition table 5.

The configuration definition table copying process 15*e* copies the data in the configuration definition table 5 to the configuration definition working table 5*a*, or vice versa.

The connection information 12 is the information of a data route from an input/output device of the subject computer to the subject input/output device via a network channel.

As described above, the system generation procedure 15 therefore updates the input/output device configuration definition table 5.

Figure 4:
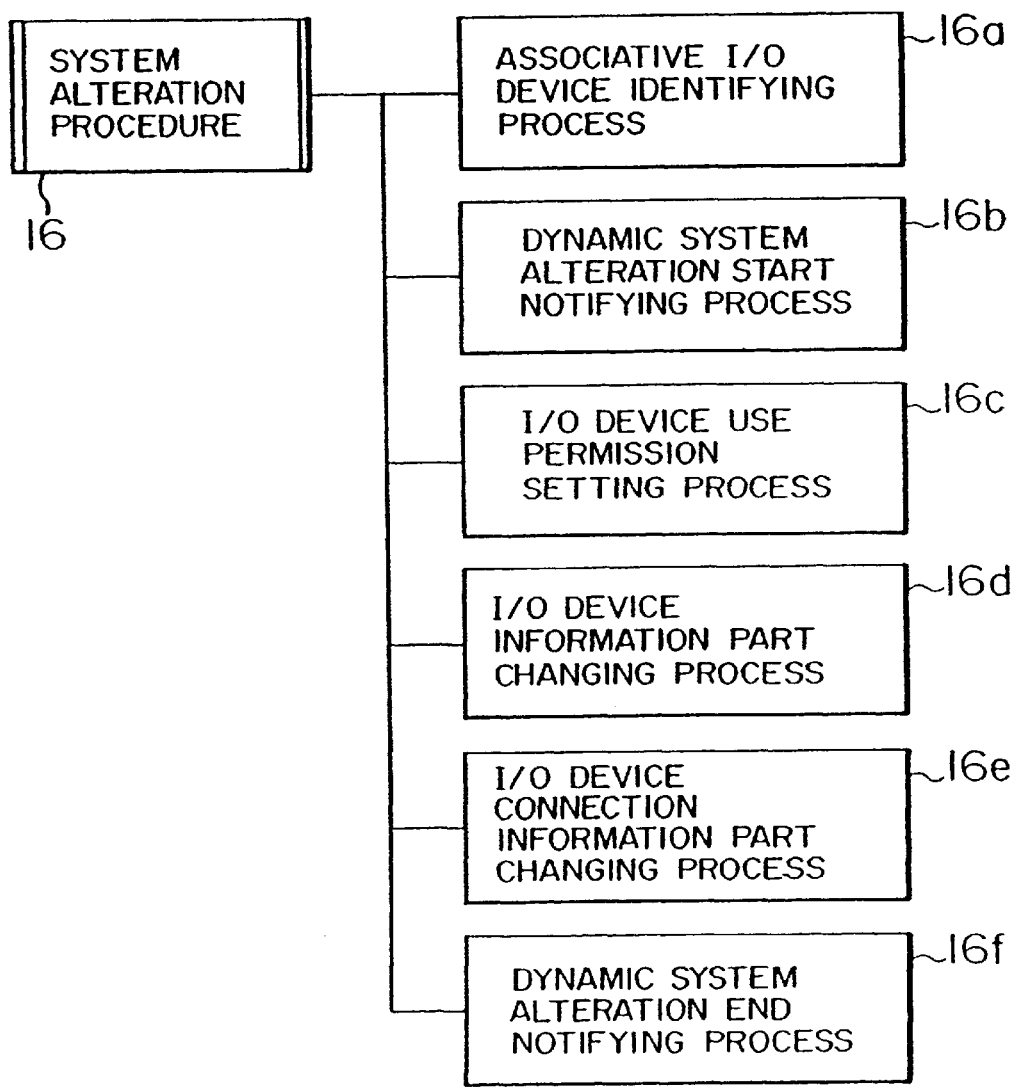
FIG. 4 is a diagram showing an example of the structure of a system alteration procedure.

As shown in FIG. 4, the system alteration procedure 16 of the configuration management program 2 includes an associative input/output device identifying process 16*a*, a dynamic system alteration start notifying process 16*b*, an input/output device use permission setting process 16*c*, an input/output device information part changing process 16*d*, an input/output device connection information part changing process 16*e*, and a dynamic system alteration end notifying process 16*f*.

The associative input/output device identifying process 16*a* identifies any associative input/output device to be affected by the dynamic system alteration, by using the changed data file 6.

The dynamic system alteration start notifying process 16*b* notifies the start of dynamic alteration of the configuration definition table 7 to all computers of the multi-computer system.

The use permission setting process 16*c* sets a use permission of an associative input/output device at the timing synchronously with all computers of the multi-computer system.

The input/output device information part changing process 16*d* changes the input/output device information part 9 of the configuration reference table 7 in accordance with the changed data file 6.

The input/output device connection information part changing process 16*e* changes the input/output device information connection part 10 of the configuration reference table 7 in accordance with the changed data file 6.

The dynamic system alteration end notifying process 16*f* notifies the end of dynamic alteration of the configuration definition table 7 and the changed data to all computers of the multi-computer system.

As described above, the system alteration procedure 15 therefore updates the input/output device configuration reference table 7.

Figure 5:
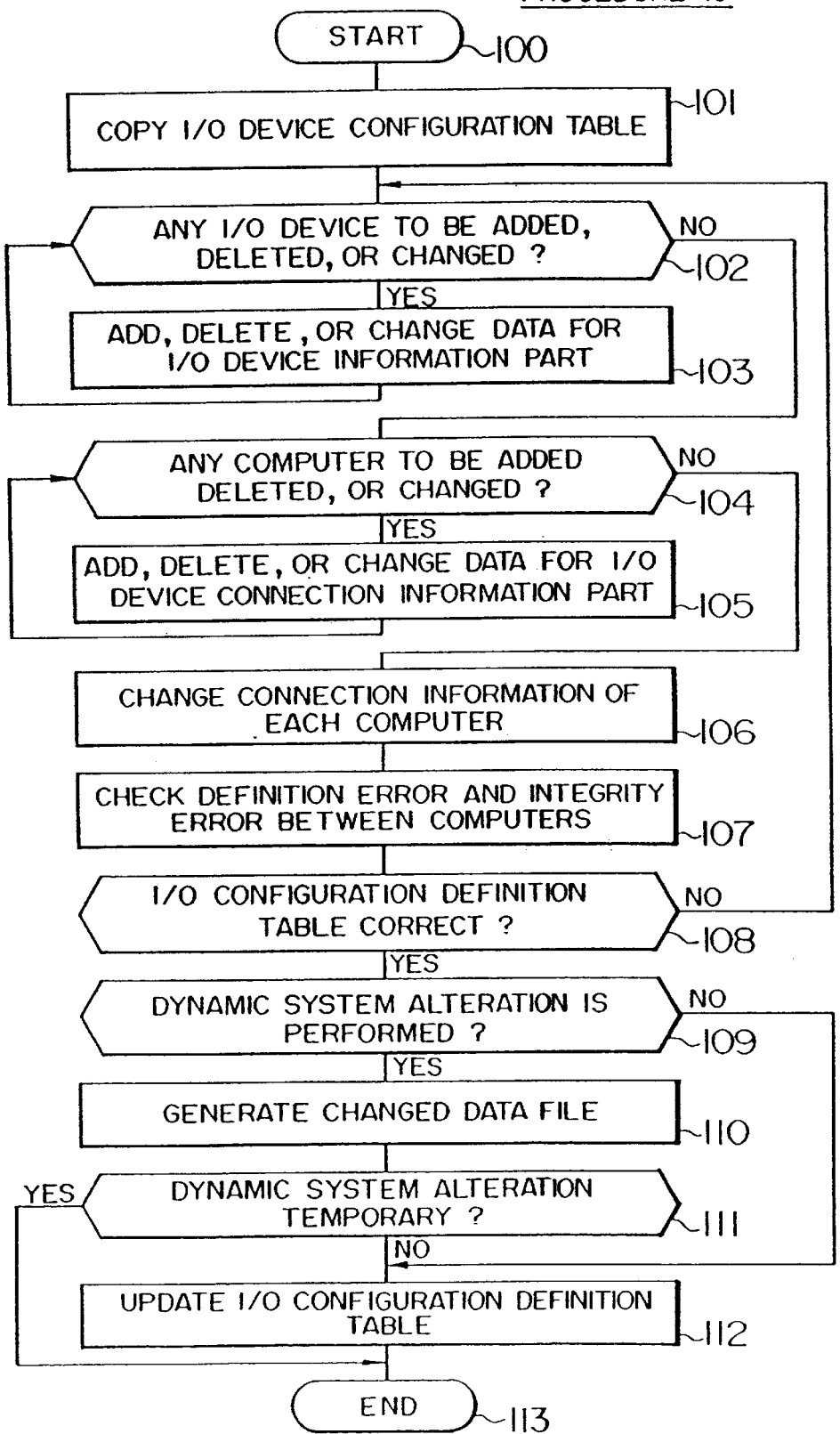
FIG. 5 is a flow chart explaining the operation of the system generation procedure.

Next, the system generation procedure 15 of the configuration management program 2 of this embodiment constructed as above will be described with reference to the flow chart shown in FIG. 5.

First, the configuration definition table copying process 15*e* copies the configuration definition table 5 to the configuration definition working table 5*a*. The input/output information part generating process 15*a* checks whether there is any input/output device to be added, deleted, or changed. If there is such an input/output device, necessary data is added to, deleted from, or changed in, the input/output device information part of the configuration definition working table 5*a*. In this case, if there is an input-output device to be added, the identification information 11 of the input/output device is defined. (Steps 101 to 103).

After the contents of the configuration definition working table 5*a* have been changed in accordance with the input/output device to be added, deleted, or changed at Steps 102 and 103, the input/output device connection information generating process 15*b* checks whether there is any computer to be added, deleted, or changed. If there is such a computer, necessary data is added to, deleted from, or changed in, the input/output device connection information part 10 of the configuration definition working table 5*a*. (Steps 104 and 105)

After the contents of the configuration definition working table 5*a* have been changed in accordance with the computer to be added, deleted, or changed at Steps 104 and 105, the input/output device connection information part generating process 19*b* changes for each input/output device the connection information 12 of each computer in the input/output device connection information part 10 of the configuration definition working table 5*a* (Step 106).

After the contents of the configuration definition table 5*a* have been changed, the configuration definition table diagnosing process 15*c* checks whether there is any definition error or an integrity error between computers in the changed configuration definition working table 5*a*. If there is an error, the procedure returns back to Step 102 to correct the configuration definition working table 5*a*. (Steps 107 and 108)

If the configuration definition working table 5*a* is judged to be correct at Step 108, it is checked whether a dynamic system alteration is performed. If a dynamic system alteration is to be performed, the changed data file generating process 15*d* generates the changed data file 6. (Steps 109 and 110)

Thereafter, it is checked whether the dynamic system alteration is temporary. If temporary, the procedure is terminated without updating the configuration definition table 5 (Step 111).

If it is judged at Step 109 not to perform a dynamic system alteration at Step 109 or if it is judged at Step 111 not temporary, the configuration definition copying process 15*e* overwrites the configuration definition working table 5*a* to the configuration definition table 5 to update the latter (Step 112).

Figure 8:
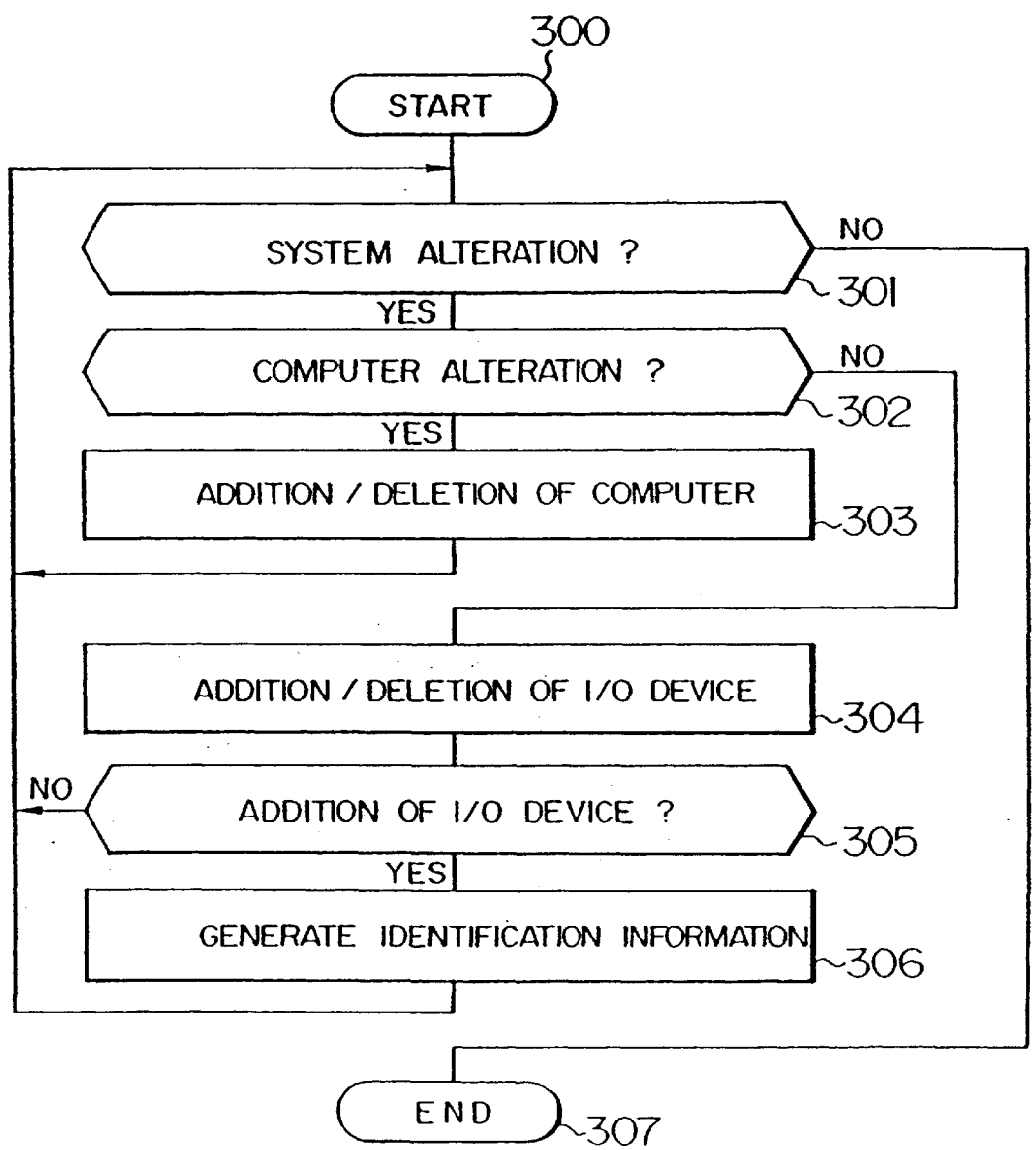
FIG. 8 is a flow chart explaining the operation of an input/output device information part generating process of the system generation procedure.

Next, the input/output device information part generating process 15*a* of the system generation procedure 15 of the configuration management program 2 will be described with reference to the flow chart shown in FIG. 8.

It is checked whether there is a system alteration and whether the configuration definition table 5*a* is changed (Step 301).

In the case of a computer alteration, addition/deletion 14 (FIG. 1B) of a computer is performed (Steps 302 and 303).

In the case of an input/output device alteration, addition/deletion 13 of an input/output device is performed. In the case of an input/output device addition, the identification information 11 is generated. (Steps 304, 305, 306)

Figure 9:
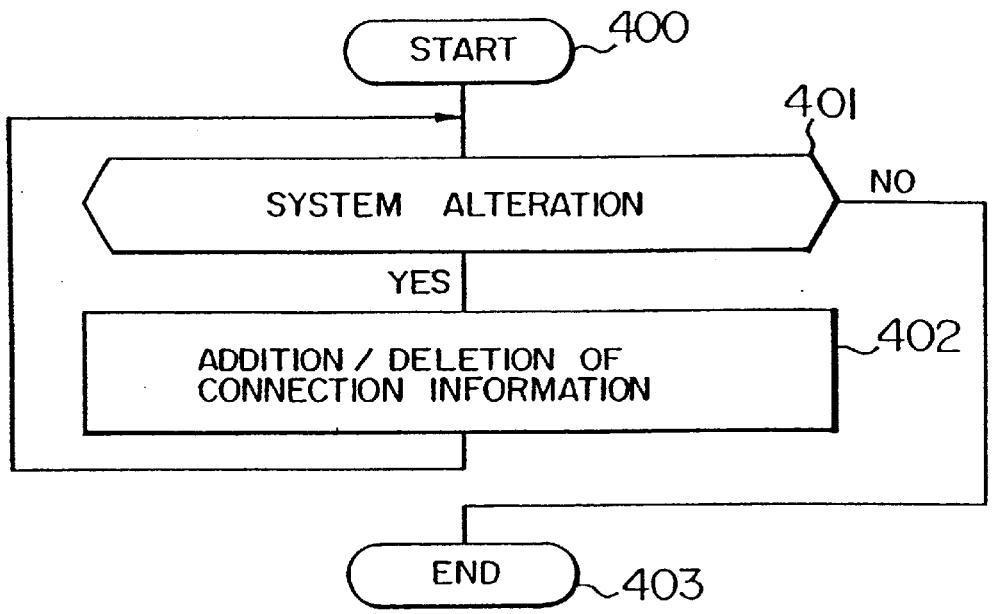
FIG. 9 is a flow chart explaining the operation of an input/output device information connection part generating process.

The input/output device connection information part generating process 15*b* of the system generation procedure 15 of the configuration management program 2 will be described with reference to the flow chart shown in FIG. 9.

It is checked whether there is a system alteration and whether the configuration definition table 5*a* is changed (Step 401).

Necessary data is added to, or deleted from, the connection information 12 (Step 402).

Figure 10:
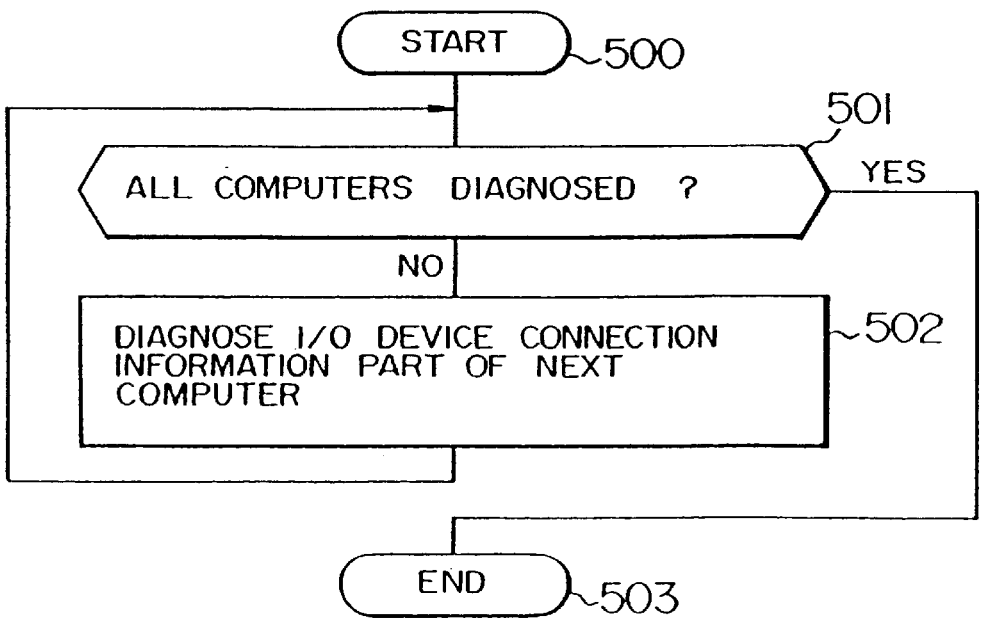
FIG. 10 is a flow chart explaining the operation of an input/output device configuration definition table diagnosing process.

The input/output device configuration definition table diagnosing process 15*c* of the system generation procedure 15 of the configuration management program 2 will be described with reference to the flow chart shown in FIG. 10.

It is checked whether all computers have been diagnosed (Step 501).

The input/output connection information part of the next computer is diagnosed (Step 502).

Figure 11:
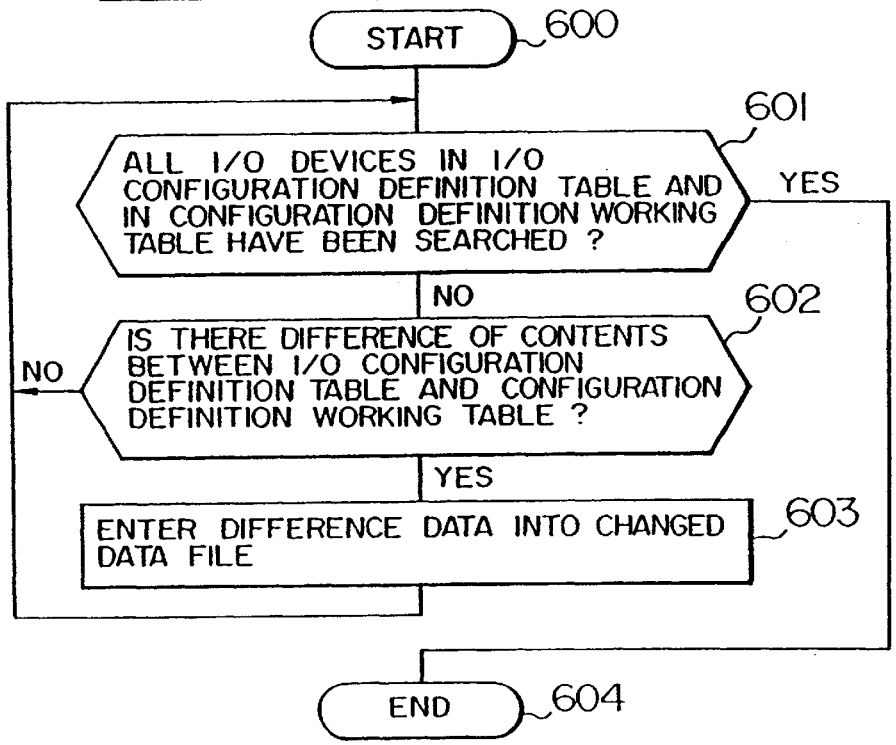
FIG. 11 is a flow chart explaining the operation of a changed data file generating process.

The changed data file generating process 15*d* of the system generation procedure 15 of the configuration management program 2 will be described with reference to the flow chart shown in FIG. 11.

It is checked whether all input/output devices in the configuration definition table 5 and in the configuration definition working table 5*a* have been searched (Step 601).

A difference of contents between the configuration definition table 5 and configuration definition working table 5*a* is stored in the changed data file 6 (Steps 602 and 603).

Figure 12:
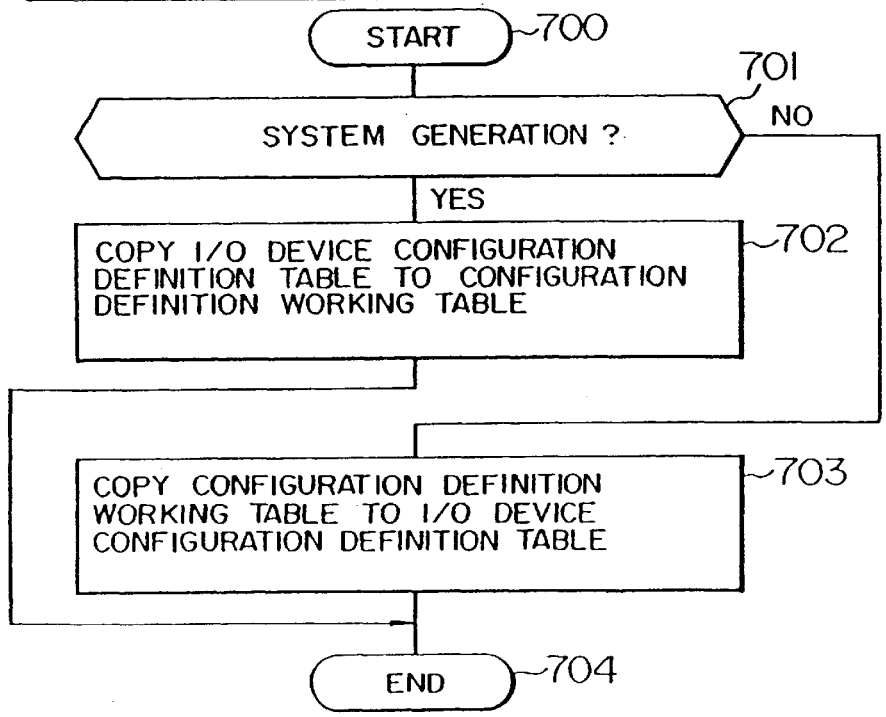
FIG. 12 is a flow chart explaining the operation of an input/output device definition table copying process.

The input/output device configuration definition table copying process 15*e* of the system generation procedure 15 of the configuration management program 2 will be described with reference to the flow chart shown in FIG. 12.

In the case of system generation start, the input/output device configuration definition table 5 is copied to the configuration definition working table 5*a* (Steps 701 and 702).

In the case of system generation end, the configuration definition working table 5*a* is copied to the input/output device configuration definition table 5 (Steps 701 and 703).

Figure 6:
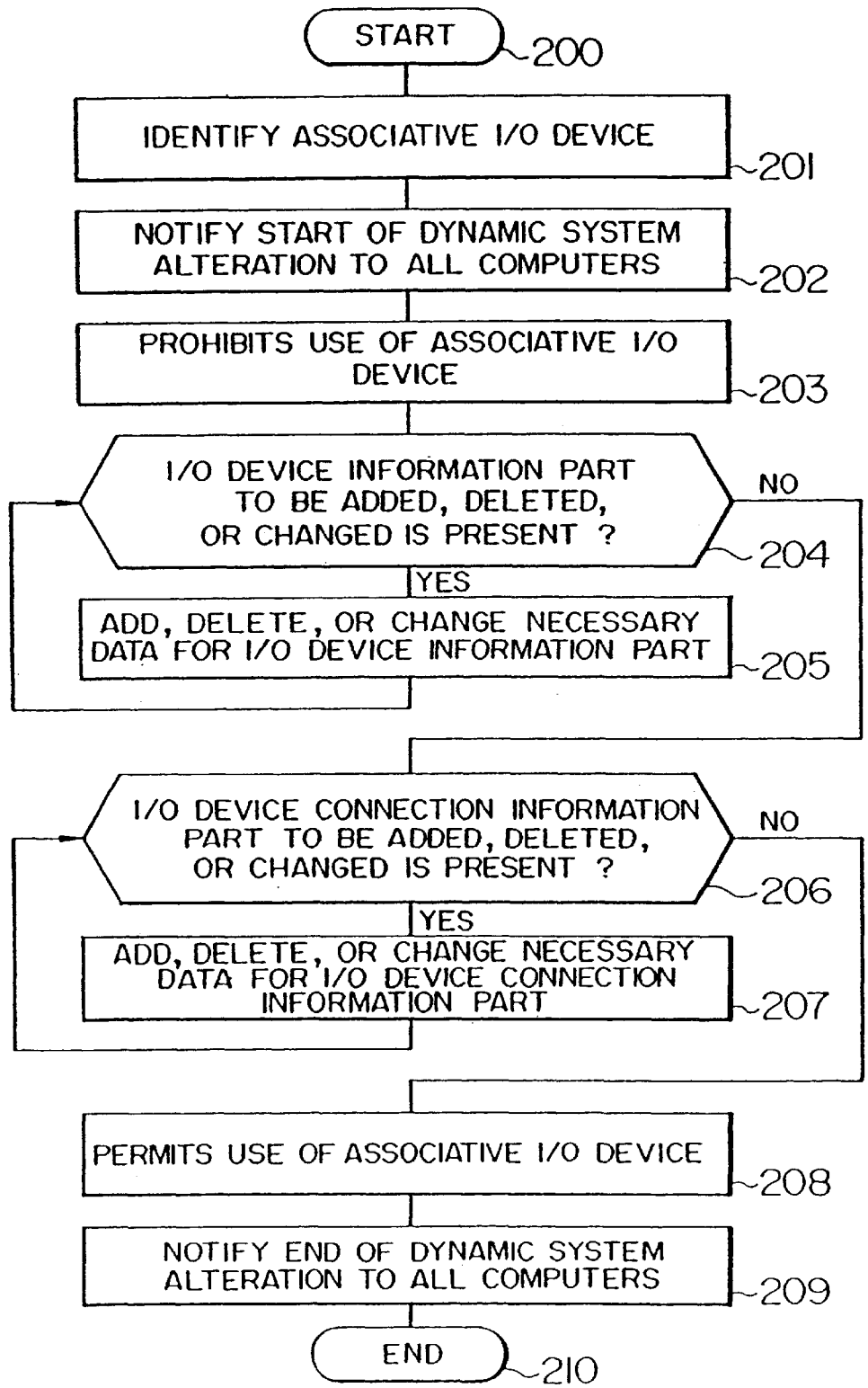
FIG. 6 is a flow chart explaining the operation of the system alteration procedure.

Next, the system alteration procedure 16 of the configuration management program 2 will be described with reference to the flow chart shown in FIG. 6.

First, the associative input/output identifying process 16*a* identifies an input/output device considered to be affected by a dynamic system alteration, in accordance with the changed data file 6. The dynamic system alteration start notifying process 16*b* notifies a dynamic system alteration start to all computers so as to prevent two or more computers in the multi-computer system from executing the dynamic system alteration at the same time. This notice may be performed, for example, by setting an indicator to the shared memory, by performing communications between computers, or by locking the shared file. (Steps 201 and 202).

Next, the input/output device use permission setting process 16*c* prohibits the associative input/output units from being used (Step 203).

Necessary data is added to, deleted from, or changed in the input/output device information part 9 of the input/output configuration reference table 7 for the associative input/output devices, by the input/output device information part changing process 16*d* (Steps 204 and 205).

After addition, deletion, or change of the input/output device information part 9 has been completed at Steps 204 and 205, necessary data is added to, deleted from, or changed in the input/output device connection information part 9 of the input/output configuration reference table 7 for the associative input/output devices, by the input/output device connection information part changing process 16*e* (Steps 207 and 208).

After addition, deletion, or change of the input/output device configuration reference table 7 has been completed at Steps 204 to 207, the input/output device use permission setting process 16*c* permits the associative input/output devices including an added input/output device to be used. Lastly, the dynamic system alteration end notifying process 16*f* notifies the end of a dynamic system alteration to all computers. (Steps 208 and 209)

After one computer 1 executes a dynamic system alteration and other computers 1 receive the notice of the end of a dynamic system alteration by the dynamic system alteration end notifying process 16*f*, the other computers can refer to the altered configuration reference table 7 without being explicitly given the changed contents.

The associative input/output device identifying process 16*a* of the system alteration procedure 16 of the configuration management program 2 will be described with reference to the flow chart shown in FIG. 13.

It is checked whether associative input/output devices of all computers 1 have been identified (Step 801).

An associative input/output device of the next computer 1 is identified (Step 802).

The dynamic system alteration start notifying process 16*b* of the system alteration procedure 16 of the configuration management program 2 will be described with reference to the flow chart shown in FIG. 14.

It is checked whether the start of a dynamic system alteration has been notified to all computers (Step 901).

The start of a dynamic system alteration is notified to the next computer (Step 902).

The input/output device use permission setting process 16*c* of the system alteration procedure 16 of the configuration management program 2 will be described with reference to the flow chart shown in FIG. 15.

It is checked whether use of associative input/output devices of all computers has been prohibited (Step 1001).

Use of associative input/output devices of the next computer is prohibited (Step 1002).

The input/output device information part changing process 16*d* of the system alteration procedure 16 of the configuration management program 2 will be described with reference to the flow chart shown in FIG. 16.

It is checked whether alteration of the input/output device configuration reference table 7 has been completed (Step 1101).

In the case of computer alteration, addition/deletion 14 (FIG. 1B) of a computer is performed (Steps 1102 and 1103).

In the case of input/output device alteration, addition/deletion 13 of an input/output device is performed, and the identification information 11 is generated (Steps 1104 to 1106).

Figure 17:
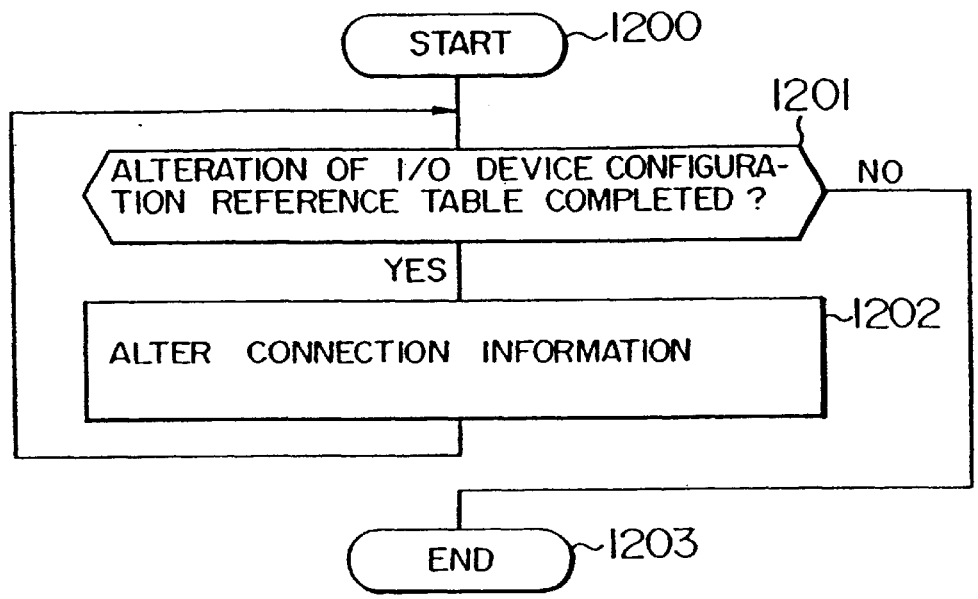
FIG. 17 is a flow chart explaining the operation of an input/output device information connection part changing process.

The input/output device connection information part changing process 16*e* of the system alteration procedure 16 of the configuration management program 2 will be described with reference to the flow chart shown in FIG. 17.

It is checked whether alteration of the input/output device configuration reference table 7 has been completed (Step 1201).

The connection information 12 is altered (Step 1202).

Figure 18:
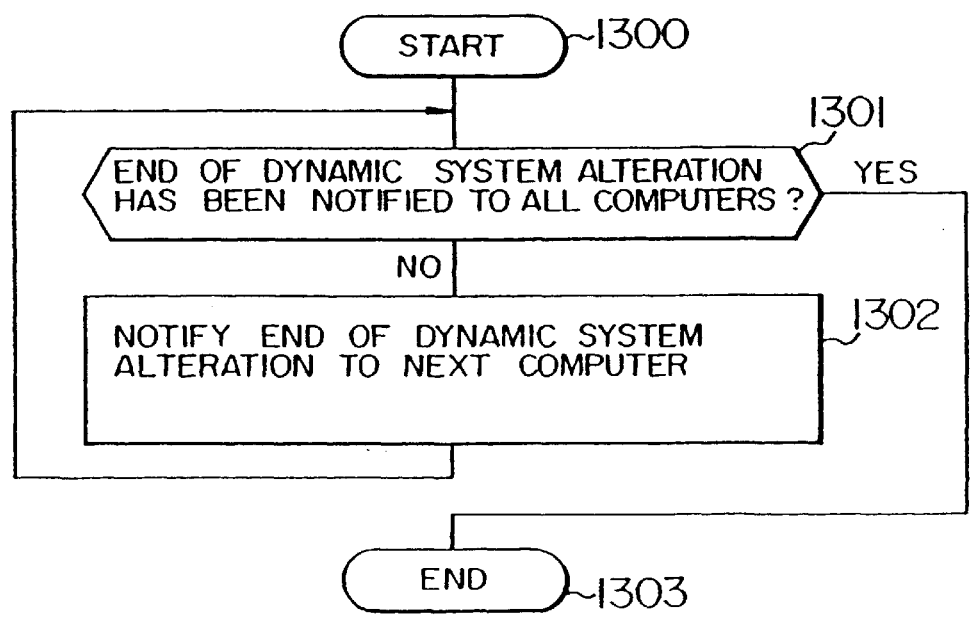
FIG. 18 is a flow chart explaining the operation of a dynamic system alteration end notifying process.

The dynamic system alteration end notifying process 16*f* of the system alteration procedure 16 of the configuration management program 2 will be described with reference to the flow chart shown in FIG. 18.

It is checked whether the end of a dynamic system alteration has been notified to all computers (Step 1301).

The end of a dynamic system alteration is notified to the next computer (Step 1302).

Next, the procedure of a dynamic system alteration will be described with reference to FIGS. 1, 2, 4, and 7.

For the preparation of the dynamic system alteration, the system generation procedure 15 of the configuration management program 2 runs on one of computers 1 to generate the changed data file 6 which may be generated at any time before the dynamic system alteration.

The dynamic system alteration is executed by the system alternation procedure of the configuration management program 2 running on one of computers 1.

Figure 7:
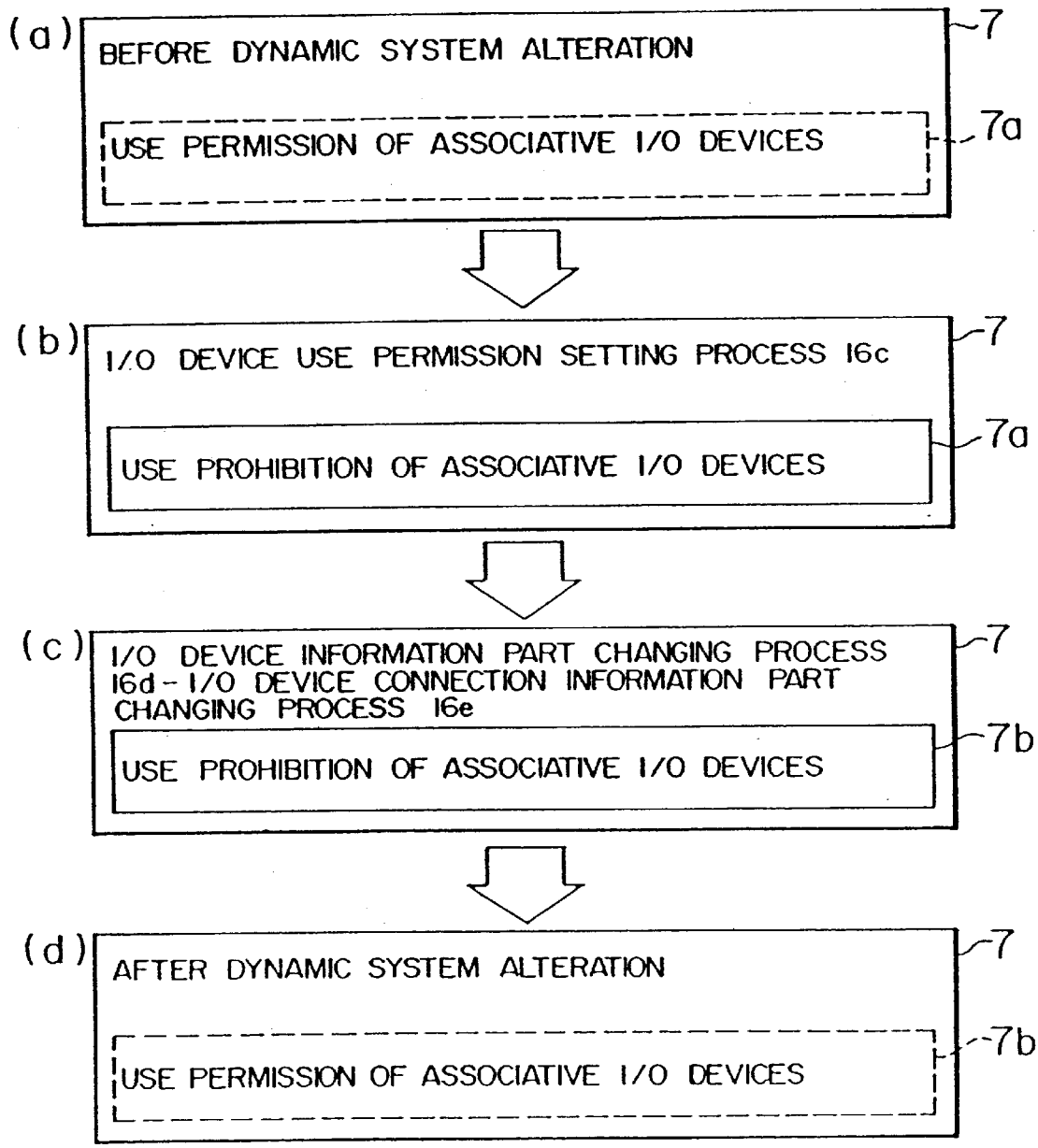
FIG. 7 is a diagram explaining a dynamic system alteration for a multi-computer system.

The input/output device configuration reference table 7 has the status (a) depicted in FIG. 7 before the dynamic system alteration. In this case, all computers 1 can use possible associative input/output devices as indicated at 7a.

After the input/output device use permission process 16c is executed, the input/output configuration reference table 7 has the status (b) depicted in FIG. 7. In this case, all computers 1 cannot use the associative input/output devices as indicated at 7b.

While the input/output device information part changing process 16d and the input/output device connection information part changing process 16e are executed to change the contents of the input/output device configuration table 7 in accordance with the changed data file, the table 7 has the status (c) depicted in FIG. 7. Also in this case, all computers 1 cannot use the associative input/output devices as indicated at 7c.

After the dynamic system alteration end notifying process 16f is executed to notify the end of a dynamic system alteration, the input/output configuration reference table 7 has the status (d) depicted in FIG. 7. In this case, all computers 1 are allowed to use the associative input/output devices as indicated at 7b, by referring to the changed input/output configuration reference table 7.

After the completion of the dynamic system alteration, an added input/output device or an added computer is permitted to use.

According to the embodiment of the invention, in a multi-computer system having a plurality of computers, any computer can define the configuration of input/output devices irrespective of whether they are shared or not. A shared input/output device is not required to be defined by all computers. Accordingly, system generation is established only by a single system generation operation so that the efficiency of system generation can be improved.

Further, according to the embodiment of the invention, when a computer is booted up, the input/output device configuration definition table is read from the shared file and transformed into the input/output configuration reference table having the format allowing the reference by each computer for the execution of data input/output of each input/output device. The input/output configuration reference table is then stored in the shared memory. Accordingly, the other computers booted up thereafter are not required to read the input/output configuration definition table, so that the computer boot-up time can be shortened.

Furthermore, according to the embodiment of the invention, the input/output configuration definition table and the input/output configuration reference table each have the input/output device information part and the input/output device connection information-part arranged in a matrix form. Accordingly, addition, deletion, or change of an input/output device and a computer can be easily performed without any constrain so that the flexibility of system configuration can be improved.

As described so far, according to the present invention, it is possible to collectively manage the input/output device configuration definition table for storing the data defining the configurations of all input/output devices used by a multi-computer system and the input/output device configuration reference table transformed into the format allowing the reference by each computer for the execution of data input/output of each input/output device. Accordingly, the input/output device configuration definition table and the input/output device configuration reference table can be dynamically updated when there is a need of alteration of input/output devices and computers of the multi-computer system.

The invention can therefore improve the system generation efficiency, shorten a system boot-up time, and improve the system configuration flexibility.

What is claimed is:

1. A computer system having control programs executable by the computer system, comprising:
    a plurality of storage devices, said plurality of storage devices connected to and shared by said control programs;
    a shared memory storing configuration information for said plurality of storage devices, said configuration information accessed by the control programs and including an information part and a connection information part,
    wherein each of said control programs referring to said configuration information stored in said shared memory to select the plurality of storage devices that adapted a requirement of the control programs.

2. The computer system according to claim 1, wherein when adding a disk storage device to the computer system, deleting a disk storage device from the computer system, or changing a disk storage device of the computer system, one of the control programs in the computer system modifies the disk storage device configuration information stored in the shared memory.

3. A computer system according to claim 2, wherein the control programs in the computer system change said disk storage device configuration information stored in the shared memory.

4. The computer system according to claim 1, wherein when adding a disk storage device to the computer system or changing a disk storage device of the computer system, it is checked that at least one of an address and a name of an added or changed disk storage device is not registered twice in the disk storage device configuration information.

5. The computer system according to claim 1, wherein when changing a disk storage device of the computer system, one of the control programs in the computer system modifies disk storage device configuration information corresponding to the changed disk storage device stored in the shared memory, the disk storage device configuration information including at least one of an attribute, a name, and an address of each device, and the other control programs in the computer system refer to the disk storage device configuration information to access the input and output devices.

6. The computer system according to claim 1, wherein when adding a control program to the computer system, deleting a control program from the computer system, or changing a control program in the computer system, one of the control programs in the computer system respectively adds, deletes or modifies a control program connection information in the disk storage device configuration information stored in the shared memory so that the added or modified control program refers to the control program connection information to access the input and output devices.

7. A method in a computer system having control programs executable by the computer system and a plurality of storage devices connected to and shared by said control programs, said method comprising the steps of:
    storing, in a shared memory, configuration information for said storage devices, said configuration information accessed by the control programs and including an information part and a connection information part; and referring, by each of said control programs, to said configuration information stored in said shared memory to select the storage devices that adapted a requirement of the control programs.

8. A method according to claim 7, further comprising the step of:

when adding a disk storage device to the computer system, deleting a disk storage device from the computer system, or changing a disk storage device of the computer system, modifying, by one of the control programs, the disk storage device configuration information stored in the shared memory.

9. A method according to claim 7, wherein the control programs in the computer system change said disk storage device configuration information stored in the shared memory.

10. A method according to claim 7, further comprising the step of:

when adding a disk storage device to the computer system or changing a disk storage device of the computer system, checking that at least one of an address and a name of an added or changed disk storage device is not registered twice in the disk storage device configuration information.

11. A method according to claim 7, further comprising the steps of:

when changing a disk storage device of the computer system, modifying, by one of the control programs in the computer system, the disk storage device configuration information corresponding to the changed disk storage device stored in the shared memory, said disk storage device configuration information including at least one of an attribute, a name, and an address of each device; and referring, by the other control programs in the computer system, to the disk storage device configuration information to access input and output devices.

12. A method according to claim 7, further comprising:

when adding a control program to the computer system, deleting a control program from the computer system, or changing a control program in the computer system, adding, deleting or modifying, by one of the control programs in the computer system, control program connection information in the disk storage device configuration information stored in the shared memory so that the added or modified control program refers to the control program connection information to access the input and output devices.

13. A computer program on a storage medium readable by a computer system having control programs executable by the computer system and a plurality of storage devices connected to and shared by said control programs, said computer program when executed causes said computer system to perform the steps of:

storing, in a shared memory, configuration information for said storage devices, said configuration information accessed by the control programs and including an information part and a connection information part; and referring, by each of said control programs, to said configuration information stored in said shared memory to select the storage devices that adapted a requirement of the control programs.

14. A computer program according to claim 13, wherein said computer program when executed further causes said computer system to perform the steps of:

when adding a disk storage device to the computer system, deleting a disk storage device from the computer system, or changing a disk storage device of the computer system, modifying, by one of the control programs, the disk storage device configuration information stored in the shared memory.

15. A computer program according to claim 13, wherein the control programs in the computer system change said disk storage device configuration information stored in the shared memory.

16. A computer program according to claim 13, wherein said computer program when executed further causes said computer system to perform the steps of:

when adding a disk storage device to the computer system or changing a disk storage device of the computer system, checking that at least one of an address and a name of an added or changed disk storage device is not registered twice in the disk storage device configuration information.

17. A computer program according to claim 13, wherein said computer program when executed further causes said computer system to perform the steps of:

when changing a disk storage device of the computer system, modifying, by one of the control programs in the computer system, the disk storage device configuration information corresponding to the changed disk storage device stored in the shared memory, said disk storage device configuration information including at least one of an attribute, a name, and an address of each device; and referring, by the other control programs in the computer system, to the disk storage device configuration information to access input and output devices.

18. A computer program according to claim 13, wherein said computer program when executed further causes said computer system to perform the steps of:

when adding a control program to the computer system, deleting a control program from the computer system, or changing a control program in the computer system, adding, deleting or modifying, by one of the control programs in the computer system, control program connection information in the disk storage device configuration information stored in the shared memory so that the added or modified control program refers to the control program connection information to access the input and output devices.

* * * * *